United States Patent
Richardson

(10) Patent No.: US 6,728,749 B1
(45) Date of Patent: Apr. 27, 2004

(54) ADAPTIVE SCHEDULING TECHNIQUE FOR MISSION CRITICAL SYSTEMS

(75) Inventor: Paul C. Richardson, Oakland County, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 836 days.

(21) Appl. No.: 09/655,628

(22) Filed: Sep. 5, 2000

(51) Int. Cl.⁷ ................................................ G06F 13/00

(52) U.S. Cl. ....................................... 709/200; 709/226

(58) Field of Search ................................. 709/200, 201, 709/203, 217, 218, 219, 220, 223, 224, 226, 227

(56) References Cited

U.S. PATENT DOCUMENTS

| | | | | |
|---|---|---|---|---|
| 5,838,968 A | * | 11/1998 | Culbert | 709/104 |
| 6,212,562 B1 | * | 4/2001 | Huang | 709/227 |
| 6,446,126 B1 | * | 9/2002 | Huang et al. | 709/226 |
| 6,658,448 B1 | * | 12/2003 | Stefaniak et al. | 709/104 |

* cited by examiner

*Primary Examiner*—Moustafa M. Meky
(74) *Attorney, Agent, or Firm*—David L. Kuhn; Gail S. Soderling; Clifford C. Carter

(57) ABSTRACT

An improved scheduling system which normally schedules the operation of number of functions using a shared resource based on time considerations is modified so as to provide a means to predict when the system has a condition that may cause the system to operate below the level required to operate all the functions. When the warning condition is triggered, the scheduler shifts to value based system where critical systems are given priority based on their criticality to the survival of the system.

1 Claim, No Drawings

ADAPTIVE SCHEDULING TECHNIQUE FOR MISSION CRITICAL SYSTEMS

GOVERNMENT INTEREST

The invention described herein may be made, used and licensed by the United Sates for governmental purposes without paying me any royalty.

BACKGROUND OF THE INVENTION

1. Field of the Invention

In one aspect this invention relates to scheduling techniques to be applied to a Local Area Network (LAN) system. In a further aspect this invention relates to a method of scheduling LAN operations to ensure continued operation of critical functions during an overload condition. In yet a further aspect this invention relates to the control function systems used in land combat vehicles and aircraft operation. In still another aspect, this invention relates to systems that are required to perform critical operations continuously in a harsh environment. The present invention speaks to the issue of fault tolerance in these types of systems.

2. Prior Art

In general, land vehicles and aircraft increasingly use embedded, distributed, real-time control systems to function. In particular, the more advanced land combat vehicles are migrating to LAN based computer architectures. The real time LAN in military vehicles provides the data communications infrastructure to control and monitor many different systems in the vehicle. The LAN must be designed so that time constraints associated with message transmissions can all be met under nominal conditions. However, while performing continuous operations in a harsh environment, a number of events could occur, i.e., component failure, electromagnetic interference, etc, that would result in permanent or transient faults in the network resulting in network overload. Under these conditions, it is unavoidable that some processes are not serviced in a timely manner. This may cause one or more subsystems using the LAN to fail. Not all sub-systems have the same value with respect to the use of LAN resources, especially when survival is paramount Furthermore, the value of a subsystem will change over time, depending on the system state and external conditions. Systems that are most important to the vehicle's survival should be given priority use of the LAN based on value considerations as opposed to time based considerations. Classical approaches to fault tolerance do not detect the presence of a fault until one or more subsystems fail at which time it may too late to recover.

The utilization of a particular LAN servicing several different systems is generally expressed by the formula:

$$U_n = \sum_{i=1}^{n} \frac{c_i}{T_i}$$

where $U_n$ is the utilization of a network that transmits n message streams, $c_i$ is the augmented transmission time for a message i, and $T_i$ is the inter-arrival times for message stream i. If $U_n$ is less than or equal to the utilization bound of the LAN for a given scheduling policy, then the scheduling policy is feasible and the LAN will meet each systems timing requirements. If $U_n$ exceeds the LAN's bound then the scheduling policy will cause certain messages to be transmitted late.

Military vehicles are exposed to conditions that are likely to over load the computing system of the vehicle. Examples are large EMF surges or destruction of a part of the vehicle containing LAN resources. While in the fault condition, the vehicle must still retain critical operational capabilities such as responding to an enemy attack. In an overload situation, when some operations will unavoidably be completed late, mission critical operations, must be given priority over non-mission critical operations. It is also necessary for best results that the LAN have a means to detect at an early stage when mission critical operations are in danger of being untimely in order to institute an adaptive scheduling procedure before the mission critical operations start to decay.

SUMMARY OF THE INVENTION

Briefly in the present invention, the real-time LAN of this invention connects and provides processing resources for various vehicle systems. The LAN will normally use a time based scheduling algorithm for determining which of several system messages should be transmitted next under normal conditions. Two classical examples of time based scheduling algorithms are Earliest Deadline First (EDF) and Rate Monotonic Scheduling (RMS). These classical scheduling schemes have been shown to be optimal algorithms that will provide the best possible results absent a system fault. Since each system in the vehicle has a need to transmit real-time messages via the LAN, these classical scheduling methods can be used to order the transmission of the pending messages. The LAN and associated shared resources are normally constructed with sufficient robustness to provide full service to all systems under nominal conditions and still have some unused capacity. The time based algorithm criteria used to schedule which information gets priority under nominal conditions is not capable of detecting the existence of a fault or overload condition.

The process of this invention uses the LAN's inherent excess capacity to provide a warning when there is a fault in the LAN that may lead to an overload and possible failure in one or more systems. The inventive process assigns the excess LAN capacity to those systems that are designated mission critical. This assignment of the excess capacity takes place in two steps: first, in the determination of feasibility, we use an altered (pseudo) inter-arrival time that is equal to the inter-arrival time value $T_i$ decremented by an additional value equal to the Worst Case Blocking Time, WCBT. The WCBT is the longest time interval that message transmissions can be blocked. In the case of a priority driven media arbitration, WCBT is equal to the time taken to transmit the largest frame assuming the LAN is operating under normal conditions. Decrementing each $T_i$ for each critical message by the WCBT ensures there is at least one scheduling opportunity for each mission critical frame before the frame will be scheduled late.

Secondly, the remaining excess capacity is distributed among the mission critical systems using a proportioning scheme based on the particular mission critical system's unique processing time ($c_i$). This further modifies the pseudo $T_i$ which will be used to determine LAN feasibility for the set of transmitted messages and which will subsequently be used by the scheduler to determine scheduling priority of individual system messages. Once the pseudo $T_i$ has been generated, any mission critical frame that the scheduler algorithm perceives as being late, using the pseudo $T_i$ will signal that the system has suffered a fault and is beginning to use excess LAN capacity. The fault status is indicated because LAN feasibility was originally verified using the pseudo $T_i$ and this condition has been violated. The only source of violation would be a fault of some kind. While the excess network capacity may maintain the system for a period of time, the existence of the fault signals the possibility that failure is impending. In this situation, the system will shift to a value based scheduling mode for the duration of the fault. In the event the fault is transient, i.e. an EMF burst, once the scheduler determines that the mission critical systems have regained a state where they are on time for at least one a full cycle, the scheduling will be returned to the time based mode and all messages regardless of importance will again be transmitted.

DETAILED DESCRIPTION

The network system of this invention will inter-connect various vehicle computer systems in order to provide real-time communication and the ability to used shared resources such as computing and data storage. While this description focuses on the vehicle computer network, it is understood that the adaptive scheduling techniques will apply to other systems that require real-time access to shared resources, such as scheduling tasks on a real-time computer system. The two scheduling examples used in this discussion are the previously identified classical time based algorithms Earliest Deadline First (EDF) and Rate Monotonic Scheduling (RMS). These classical scheduling systems are used and illustrated because they have been mathematically shown to be optimal from the perspective of guaranteeing time constraints while retaining the highest throughput. This adaptive scheduling approach may well work with other less robust and efficient schedulers should they be the scheduler of choice for other systems or reasons.

An initial analysis of the LAN system is performed to determine the capacity of the system with respect to its expected normal load. The utilization for a group of n processes requiring use of the shared processing capacity is $U_n$ and is calculated as:

$$U_n = \sum_{i=1}^{n} U_i = \sum_{i=1}^{n} \frac{c_i}{T_i}$$

which represents the sums of the individual process demands on the shared resources. In the case of networks, the items to be processed are message transmissions and $c_i$ is the augmented transmission time of a message i, $T_i$ is the inter-arrival time of the particular message. If $U_n > U_B$ where $U_B$ is the feasible upper bound for a particular scheduling algorithm, then the time constraints for this particular system are not feasible for the selected scheduling algorithm. To remedy this situation, either an alternate scheduling approach can be selected or the LAN capacity can be increased. Once a system has been designed such that $U_n$ is less than or equal to $U_B$, the LAN will have the necessary processing capability to guarantee all message time constraints under nominal conditions.

RMS scheduling is a preemptive scheduling policy that dynamically orders the processing of a message by assigning a static priority based on arrival rate. It has been shown that the minimum upper bound utilization using the RMS policy can be expressed as;

$$U_n \leq U_{MB} = n(2^{1/n} - 1)$$

As n grows larger, to a value greater than 10, the minimum upper bound will approximate 69%. When the LAN utilization exceeds the 69%, then other techniques can be used to determine feasibility such as "critical time zone analysis".

For EDF scheduling priorities are assigned dynamically. Priority assignments to use LAN shared resources are based on the process deadline at the time of scheduling. Mathematically, it has been shown all time constraints will be met using EDF if and only if:

$$U_n \leq U_B = 1.$$

Using the above formulas one can calculate the LAN resources necessary to meet the upper bound limits of the particular system. While true in principal, it is noted that the actual time taken to transmit a message depends on the length of the message and the characteristics of the underlying network such as media access control, bit rate, geographic span, bound channel time, etc. In a combat vehicle, the LAN is typically designed with sufficient robustness to provide full service to all systems under normal conditions and still have some unused capacity.

The next step in this invention's method requires the various systems that share a resource, in this case the network, be assigned a mission critical or mission non-critical rating and a value function. A mission critical rating for a process implies that the failure of that process can result in costly damage to the system or injury to personnel. An example of a mission critical process is the closed loop stabilization of a combat vehicle's weapon system that fixes the point of aim for the weapon as the vehicle traverses rough terrain. Failure to process this system's messages in a timely fashion will result in the crews' ability to accurately position the gun being degraded and thereby an inability to use the gun accurately. This can result in casualties. Value functions are functions that express the value of a mission critical process with respect to time and system state. Value functions are used to assign priorities to mission critical processes under fault and overload conditions, instead of time based metrics such as deadlines or arrival rates. Since the value of a mission critical process tends to vary with time and system state, these functions allow us to approximate optimal system behavior when it is known that system overload and potential failure are pending. Non-mission critical processes are those whose failure will not directly result in catastrophic damage or injury. Examples of such processes include various vehicle management and monitoring systems such as oil pressure, engine temperature and the like. If the monitored readings are not immediately available, the likelihood of problems is much less and generally any failure of the monitored system to gain access to the LAN's resources will require a much longer time than a mission critical system before the crew and vehicle are endangered. During fault conditions these processes can be suspended in order to make available additional network capacity.

The classical systems will assign a priority to each pending message using a time based metric such as message deadline or arrival rate frame. In this case, the network will only become aware of the occurrence of a fault when real-time message transmissions begin arriving late. A fault condition will become apparent to the scheduler when the relationship for $t_s$, $t_d$ and c, where $t_s$ is the time the frame is schedule to process, $t_d$ is the deadline the process must meet and c is the processing time necessary for the frame to be processed by the LAN resources is:

$$t_s > t_d - c$$

This is a general expression for any real-time message wishing to transmit on the network. Because of the excess capacity the fault will only become obvious when the system has already substantially consumed its excess capacity and failure is immanent. Further, the classical systems do not have the ability to go to a value based system so the system can handle critical messages while ignoring non-critical messages. Another significant aspect of the invention is the pre-allocation of unused capacity to provide an early warning of a fault occurrence in the LAN.

The method of this invention provides an early warning by dividing and assigning the excess capacity among the missions critical processes. It further distributes the excess capacity in a manner that ensures each frame of mission critical system will have at least one scheduling opportunity to be processed before it will miss its deadline. In assigning the excess capacity first one determines a quantity we call the Worst Case Blocking Time (WCBT). The WCBT depends on the underlying network characteristics, but can generally be calculated as a function of the bound channel access time and message length. As a way of ensuring the LAN and related scheduler can determine a fault has occurred prior to the failure of a mission critical process, this invention will provide at least one scheduling event before the deadline of any mission critical message. To accomplish this, a modified scheduling time $t_k$ will be used in place of the deadline, $t_d$ where:

$$t_k = t_d - c_i - WCBT$$

By effectively moving the scheduling time backward from the system's normal scheduling time by an amount of at least WCBT, the system ensures there will be at least one scheduling event before the system message is processed late even in the most extreme case and generally there will be several possible scheduling events. In addition to the WCBT, an additional increment to WCBT can be add to each individual $t_k$ so the LAN resources are seen as fully consumed by the operations to be preformed. The additional increments will vary in size and represent a proportional share of any remaining LAN capacity after the mission critical systems have had the WCBT added to their individual scheduling times. An individual system will have the proportional share of the last unclaimed excess resource based on its own arrival rate T as compared to the total arrival rates for all mission critical system T's. In this situation, where all unused system capacity has been allocated to mission critical processes, a failure of any type will result in a violation of the $t_k$ constraint, which precedes the hard $t_d$ constraint by at least WCBT. Using this method, the occurrence of a fault can be detected very soon after it occurs and well before any mission critical processes are in danger of being late. Once a fault has been detected, non-mission critical tasks are suspended and mission critical tasks are scheduled according to their value to the system at any given time.

In the event the fault is a transient surge, the modified scheduling time $t_k$ will ensure all the critical systems will have at least one opportunity to be scheduled. Once the scheduler determines that the mission critical systems have regained a stable state, indicated by a full cycle with no faults detected, the scheduling will be returned to the original time based mode and all the systems processes will again be processed in a timely manner.

As part of the scheduling protocol of this invention, value functions are assigned to each of the various mission critical systems. The value functions will normally be related to the criticality of the system to mission fulfillment. The value function also must account for the concept that a system may degrade over time as a particular system's messages are repeatedly processed late. For example if the system being considered is the gun elevation sensor and the messages are arriving at a rate much higher than the stability criteria, not processing the first message will have minor effect but as the number of messages processed late increases and the system is constantly receiving tardy feedback, the system's performance will continually degrade. Thus, the value function should change to reflect a need to raise the priority of the system to the point where the critical messages are processed in a timely enough fashion to maintain control.

When the scheduler reviews the pending messages for scheduling priorities and finds one or more system messages are scheduled late, it then begins to assign the pending messages based on the value of their value function. The priority assigned to an individual message of a system corresponds to the function: $(-v_i, 0-1(t))$. As successive messages are delayed, the value function may also change to reflect the degradation the individual system experiences as successive failures to process that system's messages compounds the system degradation. In general terms, each process will be assigned an initial value that reflects its value to the system when it is on time, generally from 0 to a positive number from 1 to 100 and a minimum value say $-1$ to $-100$ that reflects the worst case cost that late handling of the process will cause. The maximum and minimum values are used to practically bound system behavior. This provides a measure of stability to the system. Each invocation of the systems frame that is late will cause the function to move by a predetermined decrement along the slope of the curve of its function. The slope of the value function $1(t)$, is a measure of the relative value of the process with respect to time. Mission critical systems will have a steep slope, so that any time delay will rapidly raise the priority of that system's messages. In the most critical systems the slope can be defined as infinite which corresponds to a step function with even one late message causing the value function to go to its minimum value. The system will use the value function to calculate the priority once the default condition is triggered and will continue to assign values until the system runs one full cycle on time which indicates the system has regained its normal processing capacity and can be safely returned to the time based scheduler.

Working Example

This example relates to the operation of the systems used in a main battle tank. The systems, and size interval time (T) Criticality Value, Value decrement Minimum and Importance (1) are set forth in Table I:

TABLE I

| System Type | size bits | Interval ms | Critical | Normal Value | Value increment | Minimum value | Importance (I) |
|---|---|---|---|---|---|---|---|
| Gun Elevation Sensor | 32 | 1 | Yes | 20 | 0.5 | −60 | 8 |
| Gun Azimuth Sensor | 32 | 1 | Yes | 20 | 0.5 | −60 | 8 |
| Gun Elevation Actuator | 32 | 1 | Yes | 20 | 0.5 | −60 | 8 |

TABLE I-continued

| System Type | size bits | Interval ms | Critical | Normal Value | Value increment | Minimum value | Importance (I) |
|---|---|---|---|---|---|---|---|
| Gun Azimuth Actuator | 32 | 1 | Yes | 20 | 0.5 | −60 | 8 |
| Sight Azimuth Sensor | 32 | 1 | Yes | 20 | 0.5 | −60 | 8 |
| Sight Elevation Sensor | 32 | 1 | Yes | 20 | 0.5 | −60 | 8 |
| Sight Azimuth Actuator | 32 | 1 | Yes | 20 | 0.5 | −60 | 8 |
| Sight Elevation Actuator | 32 | 1 | Yes | 20 | 0.5 | −60 | 8 |
| Gun Elevation Setpoint | 32 | 20 | Yes | 20 | 0.5 | −60 | 2vt/0.1T |
| Gun Azimuth Setpoint | 32 | 20 | Yes | 20 | 0.5 | −60 | 2vt/0.1T |
| Sight Azimuth Setpoint | 32 | 20 | Yes | 20 | 0.5 | −60 | 2vt/0.1T |
| Sight Elevation Setpoint | 32 | 20 | Yes | 20 | 0.5 | −60 | 2vt/0.1T |
| Trigger Actuate | 32 | 10 | Yes | 60 | 3 | −100 | 8 |
| Target ID Query | 32 | 16 | No | 8 | 1 | −15 | 2vt/0.1T |
| Target Gun Lock | 32 | 16 | No | 8 | 1 | −15 | 2vt/T |
| Automatic Set Point Lock | 32 | 16 | No | 8 | 1 | −15 | 2vt/0.1T |
| Automatic Set Point Lock | 32 | 16 | No | 8 | 1 | −15 | 2vt/0.1T |
| Projectile Seize | 32 | 32 | No | 6 | 1 | −10 | 2vt/.3T |
| Projectile Load | 32 | 32 | No | 6 | 1 | −10 | 2vt/.3T |
| Projectile Release | 32 | 32 | No | 6 | 1 | −10 | 2vt/.3T |
| Projectile Select | 32 | 32 | No | 6 | 1 | −10 | 2vt/.3T |
| Projectile Position | 32 | 7.5 | No | 20 | 0.5 | −30 | 8 |
| Gun Elev. Actuator Fluid Level | 32 | 50 | No | 1 | 1 | −2 | 2vt/T |
| Gun Elev. Actuator Pressure | 32 | 50 | No | 1 | 1 | −2 | 2vt/T |
| Gun Azimuth Actuator Fluid Level | 32 | 50 | No | 1 | 1 | −2 | 2vt/T |
| Gun Azimuth. Actuator Fluid Pressure | 32 | 50 | No | 1 | 1 | −2 | 2vt/T |
| Sight Elev. Actuator Fluid Level | 32 | 50 | No | 1 | 1 | −2 | 2vt/T |
| Sight Elev. Actuator Pressure | 32 | 50 | No | 1 | 1 | −2 | 2vt/T |
| Sight Azimuth Actuator Fluid Level | 32 | 50 | No | 1 | 1 | −2 | 2vt/T |
| Sight Azimuth. Actuator Fluid Pressure | 32 | 50 | No | 1 | 1 | −2 | 2vt/T |
| Maintenance Sensors | 32 | 16 | No | 1 | 1 | −2 | 2vt/T |
| Maintenance Sensors | 32 | 16 | No | 1 | 1 | −2 | 2vt/T |
| Weapons Status | 4096 | 333 | No | 15 | 1 | −30 | 2vt/.2T |
| Ammunition Status | 4096 | 333 | No | 15 | 1 | −30 | 2vt/.2T |
| Sites Status | 4096 | 333 | No | 15 | 1 | −30 | 2vt/.2T |
| Situation Report | 16384 | 1000 | Yes | 50 | 10 | −80 | 2vt/T |
| Order | 16384 | 1000 | Yes | 50 | 10 | −80 | 2vt/T |
| Audio channel 1 | 2048 | 33 | No | 8 | 1 | −15 | 2vt/T |
| Audio channel 2 | 2048 | 33 | No | 8 | 1 | −15 | 2vt/T |
| System Management 1 | 4096 | 64 | No | 10 | 0.5 | −20 | 2vt/0.1T |
| System Management 2 | 4096 | 64 | No | 10 | 0.5 | −20 | 2vt/0.1T |
| System Management 3 | 4096 | 64 | No | 10 | 0.5 | −20 | 2vt/0.1T |
| System Management 4 | 4096 | 64 | No | 10 | 0.5 | −20 | 2vt/0.1T |
| System Management 5 | 4096 | 64 | No | 10 | 0.5 | −20 | 2vt/0.1T |
| System Management 6 | 4096 | 64 | No | 10 | 0.5 | −20 | 2vt/0.1T |
| System Management 7 | 4096 | 64 | No | 10 | 0.5 | −20 | 2vt/0.1T |

After assignment of the values in the table a simulation can be performed using a defined LAN. The LAN chosen was a counter-rotating ring topology as defined by SAE AS0475 with a bit rate of 10M bits per second and a maximum frame size of 128 bytes. The LAN structure simulated had 32 nodes and a media length of 150 meters. Utilization of a LAN of this configuration for the systems described in Table 1 is about 80%. The time constraint specified for each message measures the time from when a send message request arrives at the source node to the time it is delivered to the destination node.

The simulation was for five seconds after the occurrence of the a case incident. During this time there were 10 arrivals of messages with the longest interval time and 5000 arrivals of messages with the shortest inter-arrival time. A media fault was inserted into the run 3 seconds before the end of the simulation run and the fault was maintained until the end of the run. The media fault was to simulate two breaks in the ring topology which in the worst case results in a doubling of the node delays and media propagation delay. This resulted in the transmission of each frame being increased by 20.35 us.

Simulation begins with the assumption that all the messages arrive at the critical instant, which will be when network demand is at its worst case. Pending late synchronous messages are dropped because it is more effective to use the most recent data in favor of data known to be stale. The dropped message is assigned a value of −v and v will be decremented by dv. The inter-arrival time of an asynchronous message is assumed to be its deadline. Any asynchronous message that exceeds its estimated inter-arrival time is considered a fault and will continue to pend until it is scheduled and transmitted.

The simulations were run three times for each of four possible scheduling procedures, RMS EDF, AEDF ARMS. The total benefit metric was calculated and the results by scheduling are shown in Table 2.

TABLE 2

| Scheduler | Mission critical benefit score | Non-Mission critical benefit score |
|---|---|---|
| ARMS | 375 | −20 |
| AEDF | 260 | −10 |
| EDF | 175 | −10 |
| RMS | 40 | −125 |
| Nominal | 445 | 200 |

Where ARMS adds the inventive modifications to the RMS scheduler and AEDF uses the inventive modifications to the EDF scheduler. It is apparent from the table that under fault conditions, the benefit scheduling systems result in a system that maintains the mission critical systems operating at a high level and in the case of the ARMS benefit the mission critical benefit is close to the value of the nominal operating condition. It is also readily apparent from the table that the non-benefit scheduling results in serious degradation of the mission critical systems.

Various alterations and modifications will become apparent to those skilled in the art without departing from the scope and spirit of this invention and it is understood this invention is limited only by the following claims.

What is claimed is:

1. An improved method of scheduling the processing of a plurality of different systems that require the usage of a shared resource, for processing a plurality of different system messages, the messages having a deadline value before which they should be processed, using a scheduling algorithm that schedules using a time based protocol using the deadline value comprising the steps of:

designing a resource that has an excess capacity such that it is capable of operating on all the systems messages in a timely fashion so that all systems served by the resource will have all messages of all the systems acted upon before each individual message deadline requirement under normal conditions;

assigning each of the systems a mission critical or non critical rating based on the effect of a given systems degradation on the continued ability of the system to function;

decrementing the deadline values of each mission critical system by an amount equal to a worst case blocking time to absorb a portion of the unused capacity under normal operating conditions;

apportioning any remaining capacity of the shared system among the mission critical systems, to absorb any remaining capacity, of the shard resource to determine a proto-scheduling deadline for all the mission critical systems;

assigning value functions to the mission critical systems, each mission critical systems having a function related to its performance characteristics;

monitoring the shared resource as it schedules the messages using the time based algorithm the monitoring having means to determine when the mission-critical systems will be scheduled late based on the proto-deadline previously calculated;

shifting to a value based scheduling system where the messages for mission critical systems are scheduled for use of the shared resource based on the value assigned by the value function the shared resource being scheduled based on the value function until the systems has run one full cycle of all mission critical systems within the limits of the proto-scheduling deadline at which time the scheduling will be returned to the time based mode and all systems will be returned to the normal state.

* * * * *